US012577963B2

(12) United States Patent
Ito et al.

(10) Patent No.: US 12,577,963 B2
(45) Date of Patent: Mar. 17, 2026

(54) HYDRAULIC CIRCUIT CONTROL DEVICE AND MOLDING MACHINE

(71) Applicants: AISIN CORPORATION, Aichi (JP); OKAYAMA NISSO ELECTRIC CORPORATION, Okayama (JP)

(72) Inventors: Satoru Ito, Kariya (JP); Takafumi Yoshida, Kariya (JP); Ken Nakanishi, Okayama (JP); Tokuzo Sekiyama, Okayama (JP)

(73) Assignees: AISIN CORPORATION, Kariya (JP); OKAYAMA NISSO ELECTRIC CORPORATION, Okayama (JP)

( * ) Notice: Subject to any disclaimer, the term of this patent is extended or adjusted under 35 U.S.C. 154(b) by 0 days.

(21) Appl. No.: 18/856,948

(22) PCT Filed: Jun. 5, 2023

(86) PCT No.: PCT/JP2023/020797
§ 371 (c)(1),
(2) Date: Oct. 15, 2024

(87) PCT Pub. No.: WO2023/243457
PCT Pub. Date: Dec. 21, 2023

(65) Prior Publication Data
US 2025/0257794 A1     Aug. 14, 2025

(30) Foreign Application Priority Data
Jun. 13, 2022     (JP) ................................. 2022-094981

(51) Int. Cl.
*F15B 7/06* (2006.01)
*F15B 7/10* (2006.01)
(Continued)

(52) U.S. Cl.
CPC .................. *F15B 7/06* (2013.01); *F15B 7/10* (2013.01); *F15B 21/0423* (2019.01);
(Continued)

(58) Field of Classification Search
CPC ........ F15B 7/08; F15B 7/10; B29C 2045/685; B29C 2045/7271
See application file for complete search history.

(56) References Cited

U.S. PATENT DOCUMENTS 7,686,607 B2 *   3/2010   Dantlgraber ............ B29C 45/67
                                                  425/574
7,704,068 B2 *   4/2010   Dantlgraber ........ B29C 45/4005
                                                  425/589
(Continued)

FOREIGN PATENT DOCUMENTS

DE         10143013 A1 *   3/2003   ............ F15B 11/028
EP          1958754 A1 *   8/2008   ......... B29C 45/6764
(Continued)

OTHER PUBLICATIONS

International Search Report (PCT/ISA/210) with translation and Written Opinion (PCT/ISA/237) mailed on Aug. 15, 2023, by the Japanese Patent Office as the International Searching Authority for International Application No. PCT/JP2023/020797. (9 pages).

*Primary Examiner* — Thomas E Lazo
(74) *Attorney, Agent, or Firm* — BUCHANAN INGERSOLL & ROONEY PC

(57) ABSTRACT

A hydraulic circuit control device includes: a drive motor; a drive-side cylinder including a drive-side fluid chamber and a drive-side piston that is moved by the drive motor; a driven-side cylinder including a driven-side fluid chamber, a fluid path that connects the driven-side fluid chamber and
(Continued)

the drive-side fluid chamber, and a driven-side piston that is moved by moving the drive-side piston to increase or reduce an amount of a working fluid in the driven-side fluid chamber through the fluid path; and a fluid path volume adjustment mechanism configured to increase or reduce a volume of the fluid path according to an increase or reduction in a volume of the working fluid.

7 Claims, 3 Drawing Sheets

(51) Int. Cl.
　　F15B 21/0423 　　　(2019.01)
　　F16H 25/22 　　　　(2006.01)

(52) U.S. Cl.
　　CPC ...... F16H 25/22 (2013.01); F15B 2211/6306 (2013.01); F15B 2211/6343 (2013.01)

(56) References Cited

U.S. PATENT DOCUMENTS

| | | | | |
|---|---|---|---|---|
| 2003/0089187 A1* | 5/2003 | Liao | .................... | F16H 25/2204 74/424.81 |
| 2007/0137333 A1* | 6/2007 | Geissler | ................. | F16H 25/24 74/89.23 |
| 2008/0050464 A1* | 2/2008 | Dantlgraber | ........ | B29C 45/4005 425/585 |
| 2011/0154924 A1* | 6/2011 | Chiu | ................... | F16H 57/0497 74/89.43 |
| 2012/0272708 A1* | 11/2012 | Scheidl | ................ | B30B 15/161 72/453.07 |
| 2014/0033847 A1* | 2/2014 | Chiu | ................... | F16H 57/0412 74/424.86 |

FOREIGN PATENT DOCUMENTS

| | | | |
|---|---|---|---|
| JP | H02264397 A | | 10/1990 |
| JP | 11179600 A | * | 7/1999 |
| JP | H11179600 A | | 7/1999 |
| JP | 2000356202 A | | 12/2000 |

* cited by examiner

*FIG. 1*

HYDRAULIC CIRCUIT CONTROL DEVICE AND MOLDING MACHINE

TECHNICAL FIELD

This disclosure relates to a hydraulic circuit control device and a molding machine, and more particularly, relates to a hydraulic circuit control device and a molding machine, which include a drive-side cylinder and a driven-side cylinder driven by the drive-side cylinder.

BACKGROUND ART

In the related art, there is a hydraulic cylinder device including a drive-side cylinder and a driven-side cylinder driven by the drive-side cylinder. Such a hydraulic cylinder device is disclosed in, for example, JP 2000-356202A (Reference 1).

Reference 1 discloses a hydraulic cylinder device including a drive-side cylinder and a control cylinder (a driven-side cylinder) driven by the drive-side cylinder. An oil chamber in the drive-side cylinder and an oil chamber in the control cylinder are connected via a hydraulic hose (a fluid path). The hydraulic cylinder device is configured such that working oil in the oil chamber of the drive-side cylinder flows into the oil chamber of the control cylinder through the hydraulic hose as a piston of the drive-side cylinder moves forward and backward, thereby moving a piston of the control cylinder.

CITATION LIST

Patent Literature

PTL 1: JP 2000-356202A

SUMMARY

Technical Problem

However, in the hydraulic cylinder device disclosed in Reference 1, a volume of the working oil may vary due to a temperature change or leakage or the like of the working oil. In this case, since a movement amount of the piston of the control cylinder (the driven-side cylinder) relative to a predetermined movement amount of the piston of the drive-side cylinder changes (deviates from a set value) before and after the volume of the working oil varies, there is a problem that positional accuracy of the piston of the control cylinder (the driven-side cylinder) cannot be ensured.

This disclosure has been made to solve the above-described problems, and an object of this disclosure is to provide a hydraulic circuit control device and a molding machine capable of ensuring positional accuracy of a driven-side piston of a driven-side cylinder even when a volume of a working fluid varies due to a temperature change or leakage or the like of the working fluid.

Solution to Problem

In order to achieve the above object, a hydraulic circuit control device according to a first aspect of this disclosure includes: a drive motor; a drive-side cylinder including a drive-side fluid chamber and a drive-side piston that is moved by the drive motor; a driven-side cylinder including a driven-side fluid chamber, a fluid path that connects the driven-side fluid chamber and the drive-side fluid chamber, and a driven-side piston that is moved by moving the drive-side piston to increase or reduce an amount of a working fluid in the driven-side fluid chamber through the fluid path; and a fluid path volume adjustment mechanism configured to increase or reduce a volume of the fluid path according to an increase or reduction in a volume of the working fluid.

As described above, the hydraulic circuit control device according to the first aspect of this disclosure is provided with the drive-side cylinder including the drive-side piston, the driven-side cylinder including the driven-side piston that is moved by moving the drive-side piston to increase or reduce the amount of the working fluid in the driven-side fluid chamber through the fluid path, and the fluid path volume adjustment mechanism configured to increase or reduce the volume of the fluid path according to the increase or reduction in the volume of the working fluid. Accordingly, even when the volume of the working fluid is increased or reduced due to a temperature change or leakage or the like of the working fluid inside the fluid path, the driven-side fluid chamber, and the drive-side fluid chamber, the fluid path volume adjustment mechanism can increase or reduce the volume of the fluid path according to the increase or reduction in the volume of the working fluid. Therefore, the increase or reduction in the volume of the working fluid can be balanced by increasing or reducing the volume of the fluid path by the fluid path volume adjustment mechanism, so that the increase or reduction in the volume of the working fluid does not affect the movement amount of the driven-side piston. That is, the movement amount of the driven-side piston can be corrected such that the movement amount of the driven-side piston relative to a predetermined movement amount of the drive-side piston is maintained substantially constant. As a result, even when the volume of the working fluid varies due to a temperature change or leakage or the like of the working fluid, positional accuracy of the driven-side piston of the driven-side cylinder can be ensured.

In the hydraulic circuit control device according to the first aspect, it is preferable that the fluid path includes a main fluid path portion through which the working fluid flows between the driven-side fluid chamber and the drive-side fluid chamber, and an adjustment fluid path portion connected to the main fluid path portion, and the fluid path volume adjustment mechanism includes a volume adjustment motor configured to move an inner wall surface of the adjustment fluid path portion, and the inner wall surface is moved to increase or reduce a volume of the adjustment fluid path portion.

According to this configuration, since the inner wall surface of the adjustment fluid path portion can be moved by the volume adjustment motor to increase or reduce the volume of the adjustment fluid path portion, the movement amount of the driven-side piston can be easily corrected, and positional accuracy of the driven-side piston of the driven-side cylinder can be easily ensured.

In the hydraulic circuit control device according to the first aspect, it is preferable that the fluid path volume adjustment mechanism includes a movement adjustment detection unit configured to detect at least one of positions of the driven-side piston and the drive-side piston and a state of the working fluid in order to adjust the movement amount of the driven-side piston relative to movement of the drive-side piston, and the fluid path volume adjustment mechanism is configured to increase or reduce the volume of the fluid path based on a detection result of the movement adjustment detection unit.

According to this configuration, since the movement amount of the driven-side piston can be corrected based on a result obtained by detecting at least one of the positions of the driven-side piston and the drive-side piston and the state of the working fluid by the movement adjustment detection unit, it is possible to more reliably ensure positional accuracy of the driven-side piston of the driven-side cylinder according to the positions of the driven-side piston and the drive-side piston and the state of the working fluid.

In this case, it is preferable that the movement adjustment detection unit includes at least one of a position detection unit configured to detect the positions of the drive-side piston and the driven-side piston, a fluid temperature detection unit configured to detect a temperature of the working fluid, and a fluid pressure detection unit configured to detect pressure of the working fluid, and the fluid path volume adjustment mechanism increases or reduces the volume of the fluid path based on a detection result of at least one of the position detection unit, the fluid pressure detection unit, and the fluid temperature detection unit.

According to this configuration, the movement amount of the driven-side piston can be appropriately corrected according to various situations by detecting the positions of the drive-side piston and the driven-side piston indicating a movement amount change (deviation from a set value) of the driven-side piston and either the temperature or the pressure of the working fluid that affects the movement amount change of the driven-side piston.

In the hydraulic circuit control device according to the first aspect, it is preferable that the fluid path volume adjustment mechanism includes a volume adjustment piston provided in the fluid path, and a volume adjustment ball screw mechanism that includes a volume adjustment ball screw to which the volume adjustment piston is attached, and that increases or reduces the volume of the fluid path by moving the volume adjustment piston together with the volume adjustment ball screw.

According to this configuration, since the volume adjustment piston can be moved by the volume adjustment ball screw mechanism, the volume adjustment piston can be moved more accurately, and the volume of the adjustment fluid path portion can be adjusted accurately.

It is preferable that the hydraulic circuit control device according to the first aspect further includes a drive-side ball screw mechanism that includes a drive-side ball screw to which the drive-side piston is attached and that is driven by the drive motor to move the drive-side piston together with the drive-side ball screw, and a drive-side ball screw cooling path that is provided inside the drive-side ball screw and through which a coolant for cooling the drive-side ball screw flows.

According to this configuration, since the drive-side ball screw to which the drive-side piston is attached can be cooled by the drive-side ball screw cooling path, a temperature rise of the working fluid caused by the drive-side ball screw and the drive-side piston can be prevented, and a volume change of the working fluid caused by the temperature rise of the working fluid can be prevented.

In the hydraulic circuit control device according to the first aspect, it is preferable that the fluid path volume adjustment mechanism is configured to increase or reduce the volume of the fluid path based on at least one of a state index value directly indicating an increase or reduction in the volume of the working fluid and a state index value indirectly indicating an increase or reduction in the volume of the working fluid.

According to this configuration, the volume of the working fluid can be increased or reduced with higher accuracy in consideration of at least one of the state index value directly indicating the increase or reduction in the volume of the working fluid and the state index value indirectly indicating the increase or reduction in the volume of the working fluid. As a result, positional accuracy of the driven-side piston of the driven-side cylinder can be improved.

A molding machine according to a second aspect of this disclosure includes a fixed portion to which a fixed mold is attached, a movable portion to which a movable mold is attached, and a hydraulic circuit control device that is provided in the movable portion and configured to move the movable portion relative to the fixed portion, in which the hydraulic circuit control device includes a drive motor, a drive-side cylinder including a drive-side fluid chamber and a drive-side piston that is moved by the drive motor, a driven-side cylinder including a driven-side fluid chamber, a fluid path that connects the driven-side fluid chamber and the drive-side fluid chamber, and a driven-side piston that is moved by moving the drive-side piston to increase or reduce an amount of a working fluid in the driven-side fluid chamber through the fluid path, and a fluid path volume adjustment mechanism configured to increase or reduce a volume of the fluid path according to an increase or reduction in a volume of the working fluid.

As described above, the molding machine according to the second aspect of this disclosure is provided with the drive-side cylinder including the drive-side piston, the driven-side cylinder including the driven-side piston that is moved by moving the drive-side piston to increase or reduce the amount of the working fluid in the driven-side fluid chamber through the fluid path, and the fluid path volume adjustment mechanism configured to increase or reduce the volume of the fluid path according to the increase or reduction in the volume of the working fluid. Accordingly, even when the volume of the working fluid is increased or reduced due to a temperature change or leakage or the like of the working fluid inside the fluid path, the driven-side fluid chamber, and the drive-side fluid chamber, the fluid path volume adjustment mechanism can increase or reduce the volume of the fluid path according to the increase or reduction in the volume of the working fluid. Therefore, the increase or reduction in the volume of the working fluid can be balanced by increasing or reducing the volume of the fluid path by the fluid path volume adjustment mechanism, so that the increase or reduction in the volume of the working fluid does not affect a movement amount of the driven-side piston. That is, the movement amount of the driven-side piston can be corrected such that the movement amount of the driven-side piston relative to a predetermined movement amount of the drive-side piston is maintained substantially constant. As a result, even when the volume of the working fluid varies due to a temperature change or leakage or the like of the working fluid, it is possible to provide a molding machine that can ensure positional accuracy of the driven-side piston of the driven-side cylinder.

The hydraulic circuit control device according to the first aspect and the molding machine according to the second aspect may have the following configurations.

Appendix 1

That is, the hydraulic circuit control device and the molding machine described above further include a working fluid cooling path that is provided in the fluid path and through which a coolant for cooling the working fluid in the fluid path flows.

According to this configuration, since the working fluid can be cooled by the working fluid cooling path, a temperature rise of the working fluid can be prevented, and a volume change of the working fluid caused by the temperature rise of the working fluid can be prevented.

BRIEF DESCRIPTION OF DRAWINGS

FIG. 1 is a front view illustrating a press molding machine including a hydraulic circuit control device according to an embodiment;

DESCRIPTION OF EMBODIMENTS

Hereinafter, an embodiment will be described with reference to the drawings.

Embodiment (Configuration of Press Molding Machine)

A configuration of a press molding machine 100 (an example of a "molding machine" in the claims) including a hydraulic circuit control device (a hydraulic cylinder device) 101 according to an embodiment will be described with reference to FIGS. 1 to 3.

Figure 1:
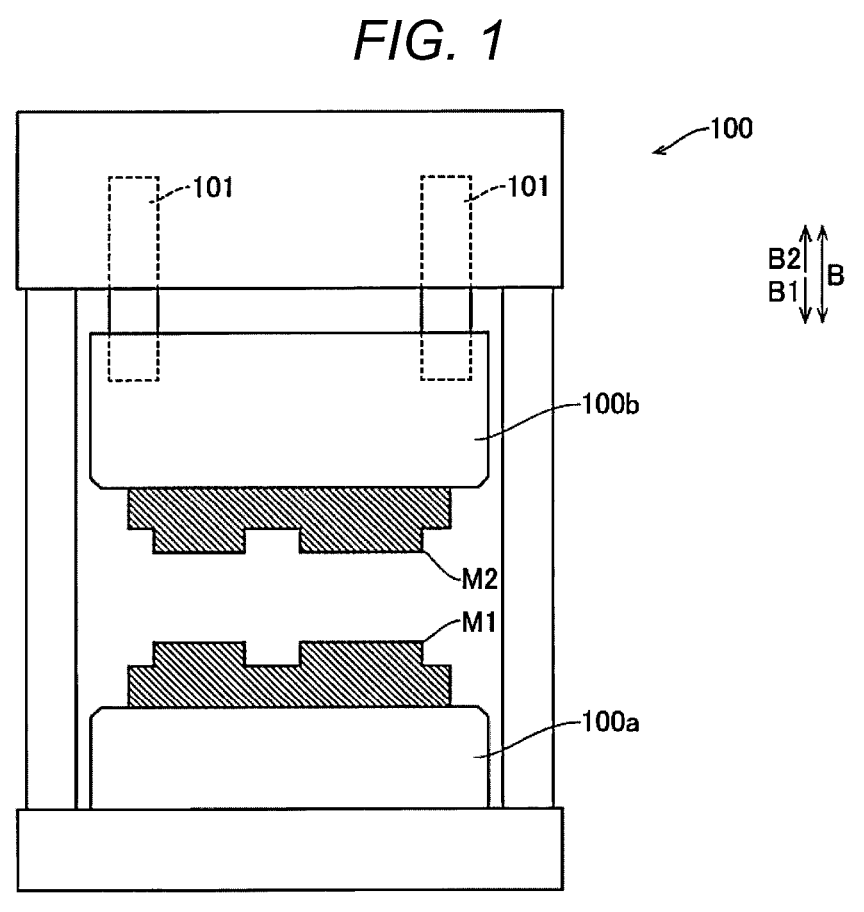

As illustrated in FIG. 1, the press molding machine 100 includes a fixed portion 100a (a bolster) to which a fixed mold M1 is attached, a movable portion 100b (a slide) to which a movable mold M2 is attached, and the hydraulic circuit control device 101 provided in the movable portion 100b.

The press molding machine 100 opens and clamps the fixed mold M1 and the movable mold M2 when the hydraulic circuit control device 101 moves, relative to the fixed portion 100a, the movable portion 100b forward and backward in an up-down direction (a B direction) from above.

(Configuration of Hydraulic Circuit Control Device)

Figure 2:
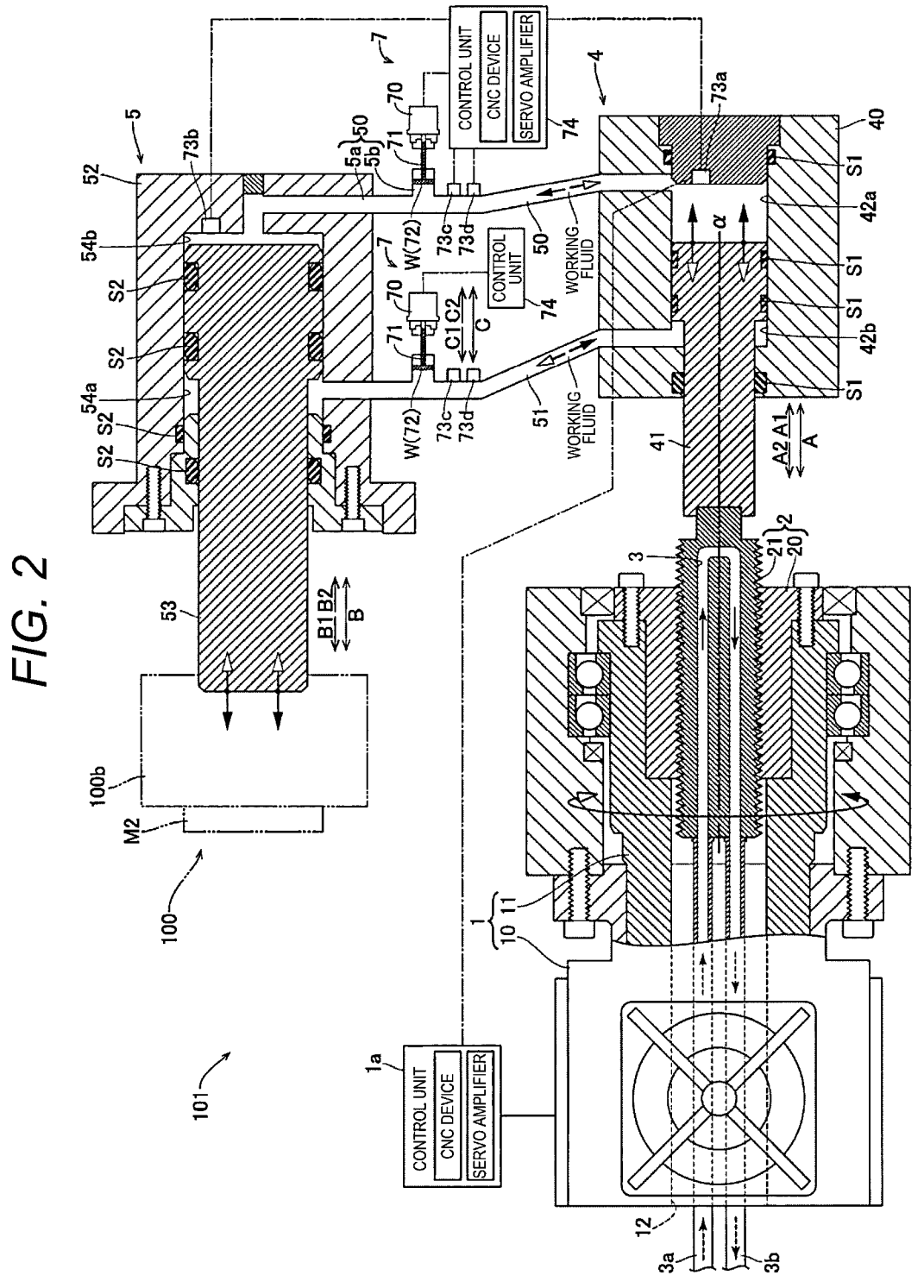
FIG. 2 is a view illustrating an overall configuration of the hydraulic circuit control device according to the embodiment.

As illustrated in FIG. 2, the hydraulic circuit control device 101 includes a drive servomotor 1 (an example of a "drive motor" in the claims), a drive-side ball screw mechanism 2, a drive-side ball screw cooling path 3, a drive-side cylinder 4, a driven-side cylinder 5 including fluid paths 50 and 51 connected to the drive-side cylinder 4, a working fluid cooling path 6 (see FIG. 3), and fluid path volume adjustment mechanisms 7. The fluid path volume adjustment mechanism 7 is provided for each of the fluid paths 50 and 51.

The drive-side cylinder 4 and the driven-side cylinder 5 send a working fluid to each other through the fluid paths 50 and 51 when the movable portion 100b is moved forward and backward. The hydraulic circuit control device 101 moves a driven-side piston 53 of the driven-side cylinder 5 forward (backward) by moving a drive-side piston 41 of the drive-side cylinder 4 forward (backward). The driven-side cylinder 5 is configured such that the movable portion 100b of the press molding machine 100 is attached to a tip end of the driven-side piston 53 in a forward direction (a B1 direction), and generates a propulsive force for finally moving the movable portion 100b forward and backward in the hydraulic circuit control device 101. The working fluid described above is an example, and may be a fluid such as oil and water.

Here, a cross-sectional area of the driven-side cylinder 5 in a cross section orthogonal to a moving direction of the driven-side piston 53 is larger than a cross-sectional area of the drive-side cylinder 4 in a cross section orthogonal to a moving direction of the drive-side piston 41. Therefore, the hydraulic circuit control device 101 is configured to be able to generate a large propulsive force for moving the movable portion 100b by performing boosting using the drive-side piston 41 and the driven-side piston 53. The cross-sectional area of the driven-side piston may be equal to or smaller than the cross-sectional area of the drive-side piston. When the cross-sectional area of the driven-side piston is smaller than the cross-sectional area of the drive-side piston, a moving speed (a movement amount) of the driven-side piston is larger than a moving speed (a movement amount) of the drive-side piston.

In each drawing, the moving direction of the drive-side piston 41 is indicated by an A direction, a forward direction of the A direction is indicated by an A1 direction, and a backward direction of the A direction is indicated by an A2 direction. An axis located at the center of the drive-side piston 41 and the center of a drive-side ball screw 21 is indicated by a central axis a, and the drive-side piston 41 and the drive-side ball screw 21 extend in the A direction.

In each drawing, the moving direction of the driven-side piston 53 is indicated by the B direction, a forward direction of the B direction is indicated by the B1 direction, and a backward direction of the B direction is indicated by a B2 direction. The B direction is also a moving direction of the movable portion 100b of the press molding machine 100.

In each drawing, a moving direction of a volume adjustment piston 72 of the fluid path volume adjustment mechanism 7 is indicated by a C direction, a forward direction of the C direction is indicated by a C1 direction, and a backward direction of the C direction is indicated by a C2 direction. When the volume adjustment piston 72 moves in the C1 direction, a volume of the fluid path 50 (51) is reduced, and when the volume adjustment piston 72 moves in the C2 direction, the volume of the fluid path 50 (51) increases.

(Configuration of Drive Servomotor)

The drive servomotor 1 moves the drive-side piston 41 of the drive-side cylinder 4 forward and backward in the A direction via the drive-side ball screw mechanism 2. The drive-side cylinder 4 is provided with a position detection unit 73a (an example of a "movement adjustment detection unit" in the claims) that detects a position of the drive-side piston 41. The drive servomotor 1 is provided with a control unit 1a that controls driving of the drive servomotor 1. The control unit 1a acquires a detection result of the position detection unit 73a through feedback and adjusts the driving of the drive servomotor 1. In short, the fluid path volume adjustment mechanism 7 increases or reduces volumes of the fluid paths 50 and 51 based on a piston position which is a state index value directly indicating an increase or reduction in a volume of a working fluid. The fluid path volume adjustment mechanism 7 increases or reduces volumes of the fluid paths 50 and 51 based on a temperature of the working fluid which is a state index value indirectly indicating an increase or reduction in a volume of the working fluid. The state index value directly indicating the increase or reduction in the volume of the working fluid is not limited to the piston position. The state index value indirectly indicating the increase or reduction in the volume of the working fluid is not limited to the temperature of the working fluid, and may be pressure of the working fluid or the like.

The control unit 1a includes a computer numerical control (CNC) device that generates a pulse signal for driving the drive servomotor 1, and a servo amplifier (a driver) that drives the drive servomotor 1 based on the pulse signal.

The drive servomotor 1 includes a motor body 10 having a core, and a rotation shaft 11 (an output shaft) that is rotated about the central axis a by the motor body 10. A through hole 12 extending along the central axis a is formed in the motor body 10 and the rotation shaft 11. A coolant supply pipe 3a for supplying a coolant to the drive-side ball screw cooling path 3 and a coolant discharge pipe 3b for discharging the coolant from the drive-side ball screw cooling path 3 are disposed inside the through hole 12.

(Configuration of Drive-Side Ball Screw Mechanism)

The drive-side ball screw mechanism 2 connects the drive servomotor 1 and the drive-side piston 41 of the drive-side cylinder 4. The drive-side ball screw mechanism 2 includes a drive-side rotation nut 20 and the drive-side ball screw 21. The drive-side ball screw mechanism 2 is driven by the drive servomotor 1 to move the drive-side piston 41 forward and backward in the A direction together with the drive-side ball screw 21.

The drive-side rotation nut 20 is attached to the rotation shaft 11 of the drive servomotor 1. Therefore, the drive-side rotation nut 20 rotates about the central axis a together with the rotation shaft 11 while maintaining a position in the A direction without moving in the A direction. The drive-side ball screw 21 extends in the A direction in a state of being constantly screwed to the drive-side rotation nut 20. The drive-side piston 41 is attached to an end portion of the drive-side ball screw 21 in the A1 direction. The drive-side ball screw 21 is disposed coaxially (on the central axis a) with the drive-side piston 41 of the drive-side cylinder 4. The drive-side ball screw 21 moves in the A direction without rotating when the rotation shaft 11 rotates.

(Configuration of Drive-Side Ball Screw Cooling Path)

The drive-side ball screw cooling path 3 is provided inside the drive-side ball screw 21. The drive-side ball screw cooling path 3 is configured such that a coolant for cooling the drive-side ball screw 21 flows through the drive-side ball screw cooling path 3. As an example, the drive-side ball screw cooling path 3 is an elongated U-shaped path extending along a longitudinal direction (the A direction) of the drive-side ball screw 21. The drive-side ball screw cooling path 3 is formed such that the coolant supply pipe 3a and the coolant discharge pipe 3b are connected to an end portion in the A2 direction of the drive-side ball screw 21, and the drive-side ball screw cooling path 3 is folded back in the vicinity of the end portion in the A1 direction of the drive-side ball screw 21.

A temperature of the drive-side ball screw 21 may greatly rise when the drive-side ball screw 21 is moved at a high speed together with the drive-side piston 41. In such a case, the drive-side ball screw cooling path 3 cools the drive-side ball screw 21 and prevents expansion of the drive-side ball screw 21, thereby preventing movement of the drive-side ball screw 21 from being hindered by the drive-side rotation nut 20 to which the drive-side ball screw 21 is screwed. Further, the drive-side ball screw cooling path 3 prevents an increase in a temperature of the working fluid around the drive-side piston 41 due to an increase in a temperature of the drive-side ball screw 21 via the drive-side piston 41 attached to the drive-side ball screw 21.

(Configuration of Drive-Side Cylinder)

The drive-side cylinder 4 includes a drive-side tube portion 40, the drive-side piston 41 that is moved by the drive servomotor 1, and drive-side fluid chambers 42a and 42b. The drive-side tube portion 40 and the drive-side piston 41 are provided with oil seals S1 that avoid (prevent) leakage of a working fluid.

The drive-side tube portion 40 is a hollow housing that houses the drive-side piston 41 therein in a state in which the drive-side piston 41 is movable in a front-rear direction (the A direction), and in which the drive-side fluid chambers 42a and 42b are provided. The position detection unit 73a that detects the position of the drive-side piston 41 is provided inside the drive-side tube portion 40. The position detection unit 73a is, for example, a non-contact detection unit that detects a distance from the position detection unit 73a to the drive-side piston 41 using light or magnetism.

The drive-side piston 41 partitions an internal space of the drive-side tube portion 40 into the drive-side fluid chamber 42a on the A1 direction side and the drive-side fluid chamber 42b on the A2 direction side. Therefore, a working fluid in the drive-side fluid chamber 42a and a working fluid in the drive-side fluid chamber 42b do not mix with each other.

When the drive-side piston 41 is moved forward (in the A1 direction), the working fluid flows out from the drive-side fluid chamber 42a to the driven-side cylinder 5 (a driven-side fluid chamber 54b) through the fluid path 50, and the working fluid flows into the drive-side fluid chamber 42b from the driven-side cylinder 5 (a driven-side fluid chamber 54a) through the fluid path 51.

When the drive-side piston 41 is moved backward (in the A2 direction), the working fluid flows into the drive-side fluid chamber 42a from the driven-side cylinder 5 (the driven-side fluid chamber 54b) through the fluid path 50, and the working fluid flows out from the drive-side fluid chamber 42b to the driven-side cylinder 5 (the driven-side fluid chamber 54a) through the fluid path 50.

(Configuration of Driven-Side Cylinder)

The driven-side cylinder 5 includes the fluid paths 50 and 51, a driven-side tube portion 52, the driven-side piston 53, and the driven-side fluid chambers 54a and 54b. The driven-side tube portion 52 and the driven-side piston 53 are provided with oil seals S2 that avoid (prevent) leakage of a working fluid.

The fluid path 50 connects the drive-side fluid chamber 42a and the driven-side fluid chamber 54b. The fluid path 50, the drive-side fluid chamber 42a, and the driven-side fluid chamber 54b form a closed circuit that allows the working fluid to flow between the drive-side fluid chamber 42a and the driven-side fluid chamber 54b without changing a total amount of the working fluid inside the fluid path 50, the drive-side fluid chamber 42a, and the driven-side fluid chamber 54b. The closed circuit is filled with the working fluid. However, the total amount of the working fluid inside the fluid path 50, the drive-side fluid chamber 42a, and the driven-side fluid chamber 54b may be reduced over time due to leakage of the working fluid through oil seals S1 to S3.

The fluid path 51 connects the drive-side fluid chamber 42b and the driven-side fluid chamber 54a. The fluid path 51, the drive-side fluid chamber 42b, and the driven-side fluid chamber 54a form a closed circuit that allows the working fluid to flow between the drive-side fluid chamber 42b and the driven-side fluid chamber 54a without changing a total amount of the working fluid inside the fluid path 51, the drive-side fluid chamber 42b, and the driven-side fluid chamber 54a. The closed circuit is filled with the working fluid. However, the total amount of the working fluid inside the fluid path 51, the drive-side fluid chamber 42b, and the driven-side fluid chamber 54a may be reduced over time due to leakage of the working fluid through the oil seals S1 to S3. The fluid paths 50 and 51 are each provided with a plug V (see FIG. 3) for replenishing the working fluid that is reduced due to leakage.

The fluid path 50 includes a main fluid path portion 5a through which the working fluid flows between the driven-side fluid chamber 54b and the drive-side fluid chamber 42a, and an adjustment fluid path portion 5b (see FIG. 3) connected to the main fluid path portion 5a. The adjustment fluid path portion 5b is disposed outside the driven-side tube portion 52 and the drive-side tube portion 40.

The main fluid path portion 5a is formed by an elongated pipe path through which the working fluid passes. The main fluid path portion 5a is a flow path in which an inner wall surface is fixed without moving, and a volume of the main fluid path portion 5a does not increase or reduce.

A part of an inner wall surface W of the adjustment fluid path portion 5b can be moved, and a volume of the adjustment fluid path portion 5b is increased or reduced as the inner wall surface W is moved. The inner wall surface W of the adjustment fluid path portion 5b is formed by a front surface (a surface on the fluid path 50 side) of the volume adjustment piston 72 (to be described later) of the fluid path volume adjustment mechanism 7. The adjustment fluid path portion 5b is connected to the main fluid path portion 5a from a lateral side (in an intersecting direction), and is a convex space protruding from the main fluid path portion 5a to the lateral side. The adjustment fluid path portion 5b extends in the C direction while maintaining a cross-sectional shape orthogonal to the C direction. That is, an extending direction of the adjustment fluid path portion 5b and an extending direction of the main fluid path portion 5a are substantially orthogonal to each other. As an example, the adjustment fluid path portion 5b is a cylindrical hollow space extending in the C direction. Further, the fluid path 51 is configured in a similar manner to the fluid path 50, and includes the main fluid path portion 5a and the adjustment fluid path portion 5b.

The driven-side tube portion 52 is a hollow housing that houses the driven-side piston 53 therein in a state in which the driven-side piston 53 is movable in the front-rear direction (the B direction) and in which the driven-side fluid chambers 54a and 54b are provided. A position detection unit 73b that detects a position of the driven-side piston 53 is provided inside the driven-side tube portion 52. The position detection unit 73b is, for example, a non-contact detection unit that detects a distance from the position detection unit 73b to the driven-side piston 53 using light or magnetism.

The driven-side piston 53 partitions an internal space of the driven-side tube portion 52 into the driven-side fluid chamber 54a on the B1 direction side and the driven-side fluid chamber 54b on the B2 direction side. Therefore, a working fluid in the driven-side fluid chamber 54a and a working fluid in the driven-side fluid chamber 54b do not mix with each other. The driven-side piston 53 is moved by moving the drive-side piston 41 to increase or reduce an amount of the working fluid in the driven-side fluid chambers 54a and 54b through the fluid paths 50 and 51.

Specifically, when the drive-side piston 41 is moved forward (in the A1 direction), the working fluid flows into the driven-side fluid chamber 54b from the drive-side fluid chamber 42a through the fluid path 50 to increase an amount of the working fluid in the driven-side fluid chamber 54b, and the working fluid flows out from the driven-side fluid chamber 54a to the drive-side fluid chamber 42b through the fluid path 51 to reduce an amount of the working fluid in the driven-side fluid chamber 54a. As a result, the driven-side piston 53 is moved forward (in the B1 direction) together with the movable portion 100b of the press molding machine 100. Accordingly, the fixed mold M1 (see FIG. 1) and the movable mold M2 are clamped.

When the drive-side piston 41 is moved backward (in the A2 direction), the working fluid flows out from the driven-side fluid chamber 54b to the drive-side fluid chamber 42a through the fluid path 50 to reduce an amount of the working fluid in the driven-side fluid chamber 54b, and the working fluid flows into the driven-side fluid chamber 54a from the drive-side fluid chamber 42b through the fluid path 51 to increase the amount of the working fluid in the driven-side fluid chamber 54a. As a result, the driven-side piston 53 is moved backward (in the B2 direction) together with the movable portion 100b of the press molding machine 100. Accordingly, the fixed mold M1 and the movable mold M2 are opened.

(Configuration of Working Fluid Cooling Path)

The working fluid cooling path 6 (see FIG. 3) is provided on the fluid paths 50 and 51, and a coolant for cooling the working fluid in the fluid paths 50 and 51 flows through the working fluid cooling path 6. The working fluid cooling path 6 is disposed outside the fluid paths 50 and 51 in a state of being in contact with the fluid paths 50 and 51. The working fluid cooling path 6 is spirally wound around the fluid paths 50 and 51. The working fluid cooling path 6 is formed of a material having a high heat transfer coefficient. As an example, the working fluid cooling path 6 is formed of copper.

(Configuration of Fluid Path Volume Adjustment Mechanism)

The fluid path volume adjustment mechanism 7 increases or reduces the volume of the fluid path 50 (51) according to an increase or reduction in a volume of the working fluid. As a result, the fluid path volume adjustment mechanism 7 performs control to keep a movement amount of the driven-side piston 53 relative to a predetermined movement amount of the drive-side piston 41 substantially constant. The increase or reduction in the volume of the working fluid is caused by leakage of the working fluid from the oil seals S1 to S3, expansion or contraction of the working fluid due to a temperature change of the working fluid, or the like.

As an example, a forward (B1 direction) movement amount of the driven-side piston 53 relative to a forward (A1 direction) movement amount of the drive-side piston 41 of 100 mm is set to 50 mm. When an actual forward (B1 direction) movement amount of the driven-side piston 53 is 52 mm instead of 50 mm, which is caused by expansion of the working fluid, the fluid path volume adjustment mechanism 7 moves backward the volume adjustment piston 72 (the inner wall surface W) to increase the volume of the adjustment fluid path portion 5b. Accordingly, an amount of a volume of the expanded working fluid is balanced by the enlarged adjustment fluid path portion 5b, and thus the movement amount of the driven-side piston 53 relative to the predetermined movement amount of the drive-side piston 41 is maintained substantially constant.

The fluid path volume adjustment mechanism 7 includes a volume adjustment servomotor 70 (an example of a "volume adjustment motor" in the claims), a volume adjustment ball screw mechanism 71, the volume adjustment piston 72, the position detection unit 73a, the position detection unit 73b (an example of a "movement adjustment detection unit" in the claims), a fluid temperature detection unit 73c (an example of a "movement adjustment detection unit" in the claims), a fluid pressure detection unit 73d (an example of a "movement adjustment detection unit" in the claims), and a control unit 74.

The volume adjustment piston 72 is provided in the adjustment fluid path portion 5b of the fluid path 50 (51). The position detection unit 73a, the position detection unit 73b, the fluid temperature detection unit 73c, and the fluid pressure detection unit 73d are detection units for adjusting the movement amount of the driven-side piston 53 relative to movement of the drive-side piston 41. The fluid path volume adjustment mechanism 7 adjusts the volume of the fluid path 50 (the adjustment fluid path portion 5b) based on detection results of the position detection unit 73a, the position detection unit 73b, the fluid temperature detection unit 73c, and the fluid pressure detection unit 73d.

Figure 3:
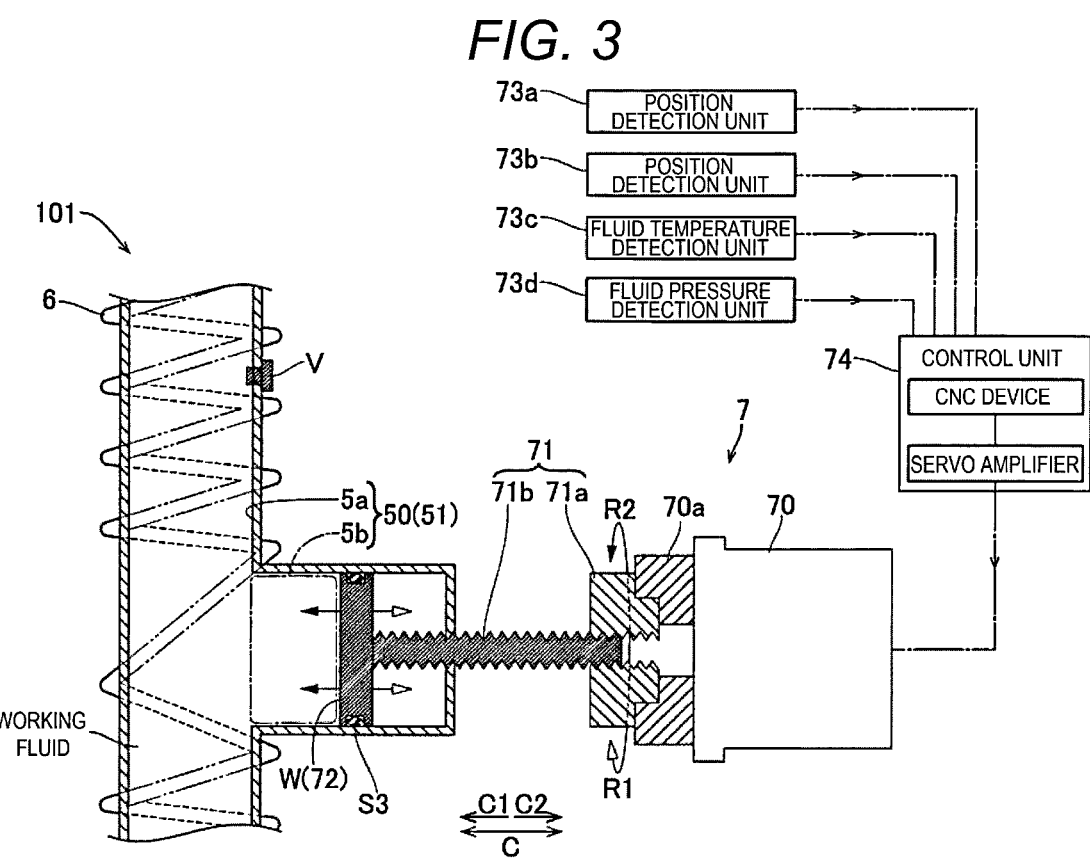
FIG. 3 is a view illustrating a fluid path volume adjustment mechanism of the hydraulic circuit control device according to the embodiment.

As illustrated in FIG. 3, the volume adjustment servomotor 70 moves the volume adjustment piston 72 forward and backward in the C direction via the volume adjustment ball screw mechanism 71. The driving of the volume adjustment servomotor 70 is controlled by the control unit 74.

The volume adjustment ball screw mechanism 71 connects the volume adjustment servomotor 70 and the volume adjustment piston 72. The volume adjustment ball screw mechanism 71 includes a volume adjustment rotation nut 71a and a volume adjustment ball screw 71b.

The volume adjustment ball screw mechanism 71 is driven by the volume adjustment servomotor 70 to move the volume adjustment piston 72 forward and backward in the C direction together with the volume adjustment ball screw 71b. The volume adjustment rotation nut 71a is attached to a rotation shaft 70a (an output shaft) of the volume adjustment servomotor 70. Therefore, the volume adjustment rotation nut 71a rotates together with the rotation shaft 70a while maintaining a position in the C direction without moving in the C direction.

The volume adjustment piston 72 is attached to an end portion in the C1 direction of the volume adjustment ball screw 71b. The fluid path volume adjustment mechanism 7 increases or reduces the volume of the fluid path 50 (51) by moving the volume adjustment piston 72 (the inner wall surface W) in the C direction together with the volume adjustment ball screw 71b.

The volume adjustment ball screw 71b extends in the C direction in a state of being constantly screwed to the volume adjustment rotation nut 71a. The volume adjustment piston 72 is attached to the end portion in the C1 direction of the volume adjustment ball screw 71b. A front surface (a surface on the C1 direction side) of the volume adjustment piston 72 constitutes the inner wall surface W of the adjustment fluid path portion 5b. The volume adjustment piston 72 is provided with the oil seal S3.

The volume adjustment piston 72 partitions into the adjustment fluid path portion 5b that is a C1-direction-side space filled with the working fluid and a C2-direction-side space into which no working fluid flows. The volume adjustment piston 72 moves the inner wall surface W in the C direction to increase or reduce the volume of the adjustment fluid path portion 5b.

For example, when the volume adjustment rotation nut 71a rotates in one rotation direction (an R1 rotation direction indicated by a white arrow), the volume adjustment piston 72 moves in the C2 direction, and thus the volume of the adjustment fluid path portion 5b is increased. Since a volume of the main fluid path portion 5a does not change, a volume of the entire fluid path 50 (51) is increased by an amount at which the adjustment fluid path portion 5b is increased.

When the volume adjustment rotation nut 71a rotates in the other rotation direction (an R2 rotation direction indicated by a black arrow), the volume adjustment piston 72 moves in the C1 direction, and thus the volume of the adjustment fluid path portion 5b is reduced. Since the volume of the main fluid path portion 5a does not change, the volume of the entire fluid path 50 is reduced by an amount at which the adjustment fluid path portion 5b is reduced.

The position detection unit 73b illustrated in FIG. 2 detects the position of the drive-side piston 41. As described above, the position detection unit 73b is provided inside the drive-side tube portion 40. A detected value of the position detection unit 73b is acquired by the control unit 1a and the control unit 74.

The position detection unit 73a detects the position of the driven-side piston 53. The position detection unit 73a is provided inside the driven-side tube portion 52. A detected value of the position detection unit 73a is acquired by the control unit 74.

The fluid temperature detection unit 73c detects a temperature (a state) of the working fluid. The fluid temperature detection unit 73c is provided in the fluid path 50 (51). A detected value of the fluid temperature detection unit 73c is acquired by the control unit 74.

The fluid pressure detection unit 73d detects pressure (a state) of the working fluid. The fluid pressure detection unit 73d is provided in the fluid path 50 (51). A detected value of the fluid pressure detection unit 73d is acquired by the control unit 74.

The control unit 74 acquires detection results of the position detection unit 73a, the position detection unit 73b, the fluid temperature detection unit 73c, and the fluid pressure detection unit 73d through feedback and adjusts driving of the volume adjustment servomotor 70. The control unit 74 includes a computer numerical control (CNC) device that generates a pulse signal for driving the volume adjustment servomotor 70, and a servo amplifier (a driver) that drives the volume adjustment servomotor 70 based on the pulse signal.

(Control Configuration of Control Unit)

A control configuration of the control unit 74 will be described.

In a case where there is no temperature change in the working fluid, when the control unit 74 determines that a movement amount of the driven-side piston 53 relative to a predetermined movement amount of the drive-side piston 41 is smaller than a set value (a reference value) based on detected values of the position detection unit 73a and the position detection unit 73b, the control unit 74 performs control to reduce the volume of the adjustment fluid path portion 5b by moving (moving forward) the volume adjustment piston 72 (the inner wall surface W) in the C1 direction. That is, the control unit 74 performs control to push the working fluid in the adjustment fluid path portion 5b into the main fluid path portion 5a. A reduction amount in the volume of the adjustment fluid path portion 5b in this case is substantially equal to a reduction amount in a volume of the driven-side fluid chamber 54a (the driven-side fluid chamber 54b) calculated based on the movement amount of the driven-side piston 53 that is smaller than the set value. As a result, the movement amount of the driven-side piston 53 relative to the predetermined movement amount of the drive-side piston 41 is corrected to be the set value. In the case where there is no temperature change in the working fluid, when the movement amount of the driven-side piston 53 relative to the predetermined movement amount of the drive-side piston 41 is smaller than the set value, for example, the reason may be leakage of the working fluid.

In a case where there is no leakage of the working fluid, when the control unit 74 determines that a temperature of the working fluid is lower than a set value based on a detected value of the working fluid temperature detection unit 73c, the control unit 74 performs control to reduce the volume of the adjustment fluid path portion 5b by moving (moving forward) the volume adjustment piston 72 (the inner wall surface W) in the C1 direction in consideration of a contraction ratio of the working fluid caused by a temperature drop.

In a case where there is no leakage of the working fluid, when the control unit 74 determines that a temperature of the working fluid is higher than the set value based on a detected value of the working fluid temperature detection unit 73c, the control unit 74 performs control to increase the volume of the adjustment fluid path portion 5b by moving (moving backward) the volume adjustment piston 72 (the inner wall surface W) in the C2 direction in consideration of an expansion rate of the working fluid caused by a temperature rise.

When the control unit 74 determines that pressure of the working fluid is (greatly) lower than a set value (when the control unit 74 determines that the pressure is lower than a predetermined threshold) or the like based on a detected value of the fluid pressure detection unit 73d, the control unit 74 performs control to increase the volume of the adjustment fluid path portion 5b by moving (moving forward) the volume adjustment piston 72 (the inner wall surface W) in the C1 direction. When the pressure of the working fluid is (greatly) lower than the set value (when it is determined that the pressure is lower than the predetermined threshold), a propulsive force of the movable portion 100b that is moved together with the driven-side piston 53 is not sufficient, and a clamping force of the fixed mold M1 and the movable mold M2 is not sufficient.

Effects of Embodiment

In the present embodiment, the following effects can be obtained.

In the present embodiment, as described above, the hydraulic circuit control device 101 is provided with the drive-side cylinder 4 including the drive-side piston 41, the driven-side cylinder 5 including the driven-side piston 53 that is moved by moving the drive-side piston 41 to increase or reduce the amount of the working fluid in the driven-side fluid chambers 54a and 54b through the fluid paths 50 and 51, and the fluid path volume adjustment mechanism 7 that increases or reduces the volumes of the fluid paths 50 and 51 according to the increase or reduction in the volume of the working fluid. Accordingly, even when the volume of the working fluid is increased or reduced due to a temperature change or leakage or the like of the working fluid inside the fluid paths 50 and 51, the driven-side fluid chambers 54a and 54b, and the drive-side fluid chambers 42a and 42b, the fluid path volume adjustment mechanism 7 can increase or reduce the volumes of the fluid paths 50 and 51 according to the increase or reduction in the volume of the working fluid. Therefore, the increase or reduction in the volume of the working fluid can be balanced by increasing or reducing the volumes of the fluid paths 50 and 51 by the fluid path volume adjustment mechanism 7, so that the increase or reduction in the volume of the working fluid does not affect the movement amount of the driven-side piston 53. That is, the movement amount of the driven-side piston 53 can be corrected such that the movement amount of the driven-side piston 53 relative to a predetermined movement amount of the drive-side piston 41 is maintained substantially constant. As a result, even when the volume of the working fluid varies due to a temperature change or leakage or the like of the working fluid, positional accuracy of the driven-side piston 53 of the driven-side cylinder 5 can be ensured.

In the present embodiment, as described above, each of the fluid paths 50 and 51 includes the main fluid path portion 5a through which the working fluid flows between the driven-side fluid chambers 54a and 54b and the drive-side fluid chambers 42a and 42b, and the adjustment fluid path portion 5b connected to the main fluid path portion 5a, and the fluid path volume adjustment mechanism 7 includes the volume adjustment servomotor 70 that moves the inner wall surface W of the adjustment fluid path portion 5b, and the inner wall surface W is moved to increase or reduce the volume of the adjustment fluid path portion 5b. Accordingly, the inner wall surface W of the adjustment fluid path portion 5b can be moved by the volume adjustment servomotor 70 to increase or reduce the volume of the adjustment fluid path portion 5b, and thus a movement amount of the driven-side piston 53 can be easily corrected, and positional accuracy of the driven-side piston 53 of the driven-side cylinder 5 can be easily ensured.

In the present embodiment, as described above, the fluid path volume adjustment mechanism 7 includes the movement adjustment detection unit (the position detection units 73a and 73b, the fluid temperature detection unit 73c, and the fluid pressure detection unit 73d) that detects at least one of positions of the driven-side piston 53 and the drive-side piston 41 and a state of the working fluid in order to adjust a movement amount of the driven-side piston 53 relative to movement of the drive-side piston 41, and increases or reduces volumes of the fluid paths 50 and 51 based on a detection result of the movement adjustment detection unit. Accordingly, the movement amount of the driven-side piston 53 can be corrected based on the result obtained by detecting at least one of the positions of the driven-side piston 53 and the drive-side piston 41 and the state of the working fluid by the movement adjustment detection unit, and thus it is possible to more reliably ensure positional accuracy of the driven-side piston 53 of the driven-side cylinder 5 according to the positions of the driven-side piston 53 and the drive-side piston 41 and the state of the working fluid.

In the present embodiment, as described above, the movement adjustment detection unit includes at least one of the position detection units 73a and 73b that detect the positions of the drive-side piston 41 and the driven-side piston 53, the fluid temperature detection unit 73c that detects a temperature of the working fluid, and the fluid pressure detection unit 73d that detects pressure of the working fluid, and the fluid path volume adjustment mechanism 7 increases or reduces volumes of the fluid paths 50 and 51 based on a detection result of at least one of the position detection units 73a and 73b, the fluid pressure detection unit 73d, and the fluid temperature detection unit 73c. Accordingly, a movement amount of the driven-side piston 53 can be appropriately corrected according to various situations by detecting the positions of the drive-side piston 41 and the driven-side piston 53 indicating a movement amount change (deviation from a set value) of the driven-side piston 53 and either the temperature or the pressure of the working fluid that affects the movement amount change of the driven-side piston 53.

In the present embodiment, as described above, the fluid path volume adjustment mechanism 7 includes the volume adjustment piston 72 provided in each of the fluid paths 50 and 51, and the volume adjustment ball screw mechanism 71 that includes the volume adjustment ball screw 71*b* to which the volume adjustment piston 72 is attached, and that increases or reduces volumes of the fluid paths 50 and 51 by moving the volume adjustment piston 72 together with the volume adjustment ball screw 71*b*. Accordingly, the volume adjustment piston 72 can be moved by the volume adjustment ball screw mechanism 71, and thus the volume adjustment piston 72 can be moved accurately, and the volume of the adjustment fluid path portion 5*b* can be adjusted accurately.

In the present embodiment, as described above, the hydraulic circuit control device 101 is further provided with the drive-side ball screw mechanism 2 that includes the drive-side ball screw 21 to which the drive-side piston 41 is attached and that is driven by the drive servomotor 1 to move the drive-side piston 41 together with the drive-side ball screw 21, and the drive-side ball screw cooling path 3 that is provided inside the drive-side ball screw 21 and through which a coolant for cooling the drive-side ball screw 21 flows. Accordingly, the drive-side ball screw 21 to which the drive-side piston 41 is attached can be cooled by the drive-side ball screw cooling path 3, and thus a temperature rise of the working fluid caused by the drive-side ball screw 21 and the drive-side piston 41 can be prevented, and a volume change of the working fluid caused by the temperature rise of the working fluid can be prevented.

In the present embodiment, as described above, the hydraulic circuit control device 101 is further provided with the working fluid cooling path 6 that is provided on the fluid paths 50 and 51 and through which a coolant for cooling the working fluid in the fluid paths 50 and 51 flows. Accordingly, the working fluid can be cooled by the working fluid cooling path 6, and thus a temperature rise of the working fluid can be prevented, and a volume change of the working fluid caused by the temperature rise of the working fluid can be prevented.

In the present embodiment, as described above, the fluid path volume adjustment mechanism 7 increases or reduces volumes of the fluid paths 50 and 51 based on both the state index value directly indicating the increase or reduction in the volume of the working fluid and the state index value indirectly indicating the increase or reduction in the volume of the working fluid. Accordingly, the volume of the working fluid can be increased or reduced with higher accuracy in consideration of both the state index value directly indicating the increase or reduction in the volume of the working fluid and the state index value indirectly indicating the increase or reduction in the volume of the working fluid. As a result, positional accuracy of the driven-side piston 53 of the driven-side cylinder 5 can be improved.

Modification

The embodiment disclosed herein should be considered to be illustrative and not restrictive in all respects. The scope of this disclosure is indicated not by the description of the above embodiment but by the claims, and includes all changes (modifications) within the meaning and scope equivalent to the claims.

Figure 4:
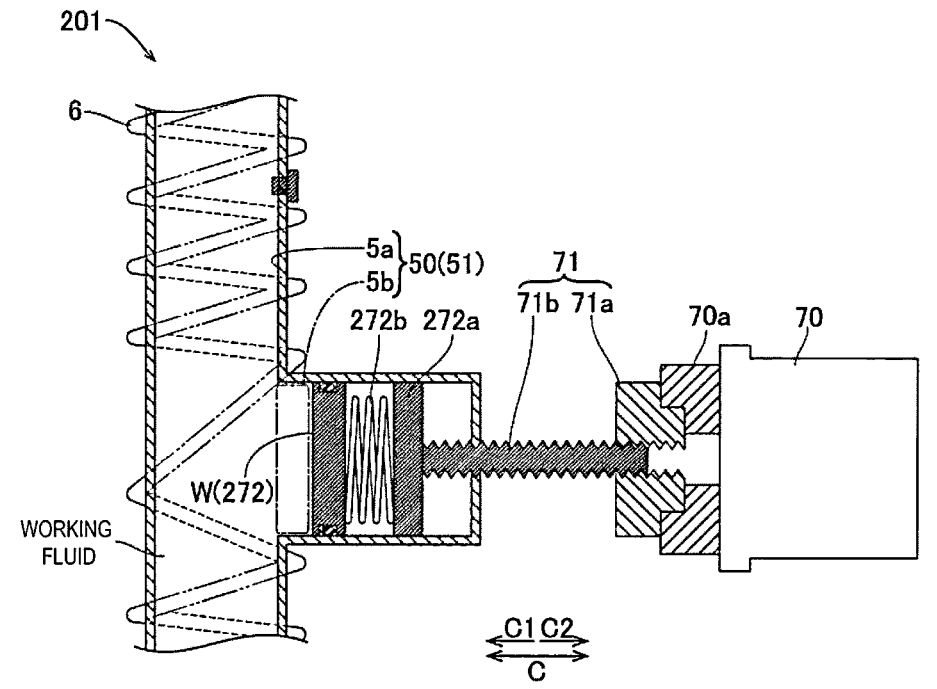
FIG. 4 is a view illustrating a fluid path volume adjustment mechanism of a hydraulic circuit control device according to a modification.

For example, although the volume adjustment piston of the fluid path volume adjustment mechanism is directly attached to a tip end of the volume adjustment ball screw (an end portion in the C1 direction) in the above embodiment, this disclosure is not limited thereto. In this disclosure, as in a hydraulic circuit control device 201 illustrated in FIG. 4, a plate member 272*a* may be directly attached to a tip end (an end portion in the C1 direction) of the volume adjustment ball screw 71*b*, and a spring member 272*b* may be provided between the plate member 272*a* and a volume adjustment piston 272. The hydraulic circuit control device 201 can absorb (buffer) an impact applied to the driven-side piston using the spring member 272*b*.

Although the molding machine disclosed here is implemented by a press molding machine in the above embodiment, this disclosure is not limited thereto. In this disclosure, the molding machine may be an injection molding machine or a die casting machine.

Although the hydraulic circuit control device is provided in the press molding machine (the molding machine) in the above embodiment, this disclosure is not limited thereto. In this disclosure, the hydraulic circuit control device may be provided in a machine tool, an inspection device, or the like.

Although the drive-side fluid chamber on a front side of the drive-side piston and the driven-side fluid chamber on a rear side of the driven-side piston are connected by one fluid path, and the drive-side fluid chamber on a rear side of the drive-side piston and the driven-side fluid chamber on a front side of the driven-side piston are connected by the other fluid path in the above embodiment, this disclosure is not limited thereto. In this disclosure, the drive-side fluid chamber on the front side of the drive-side piston and the driven-side fluid chamber on the front side of the driven-side piston may be connected by one fluid path, and the drive-side fluid chamber on the rear side of the drive-side piston and the driven-side fluid chamber on the rear side of the driven-side piston may be connected by the other fluid path.

Although the working fluid cooling path is disposed outside the fluid path in the above embodiment, this disclosure is not limited thereto. In this disclosure, the working fluid cooling path may be disposed inside the fluid path so that the working fluid cooling path is in direct contact with the working fluid.

Although the drive motor disclosed here is implemented by a servomotor in the above embodiment, this disclosure is not limited thereto. In this disclosure, the drive motor may be implemented by a different type of motor such as a stepping motor.

Although the fluid path includes two types of portions of the main fluid path portion and the adjustment fluid path portion in the above embodiment, this disclosure is not limited thereto. In this disclosure, the fluid path may include only a fluid path portion (the main fluid path portion) through which the working fluid flows between the driven-side fluid chamber and the drive-side fluid chamber. That is, the fluid path volume adjustment mechanism may move an inner wall surface of the fluid path portion (the main fluid path portion) through which the working fluid flows between the driven-side fluid chamber and the drive-side fluid chamber.

Although the hydraulic circuit control device includes two fluid path volume adjustment mechanisms in the above embodiment, this disclosure is not limited thereto. In this disclosure, the hydraulic circuit control device may include one or three or more fluid path volume adjustment mechanisms.

Although the volume adjustment piston is attached to the volume adjustment ball screw and the volume adjustment piston is moved in the C direction together with the volume adjustment ball screw in the above embodiment, this disclosure is not limited thereto. In this disclosure, the volume adjustment piston may be attached to the volume adjustment rotation nut, and the volume adjustment piston may be moved in the C direction together with the volume adjustment rotation nut. In this case, the volume adjustment ball screw mechanism is configured such that the volume adjustment ball screw does not move in the C direction.

Although the fluid path volume adjustment mechanism increases or reduces the volume of the fluid path based on both the state index value directly indicating the increase or reduction in the volume of the working fluid and the state index value indirectly indicating the increase or reduction in the volume of the working fluid in the above embodiment, the fluid path volume adjustment mechanism may increase or reduce the volume of the fluid path based on only one of the state index value directly indicating the increase or reduction in the volume of the working fluid and the state index value indirectly indicating the increase or reduction in the volume of the working fluid.

REFERENCE SIGNS LIST

1: drive servomotor (drive motor)
2: drive-side ball screw mechanism
3: drive-side ball screw cooling path
4: drive-side cylinder
5: driven-side cylinder
5a: main fluid path portion
5b: adjustment fluid path portion
7: fluid path volume adjustment mechanism
21: drive-side ball screw
41: drive-side piston
42a, 42b: drive-side fluid chamber
50, 51: fluid path
53: driven-side piston
54a, 54b: driven-side fluid chamber
70: volume adjustment servomotor (volume adjustment motor)
71: volume adjustment ball screw mechanism
71b: volume adjustment ball screw
72, 272: volume adjustment piston
73a: position detection unit (for detecting position of drive-side piston) (movement adjustment detection unit)
73b: position detection unit (for detecting position of driven-side piston) (movement adjustment detection unit)
73c: fluid temperature detection unit (movement adjustment detection unit)
73d: fluid pressure detection unit (movement adjustment detection unit)
100: press molding machine (molding machine)
100a: fixed portion
100b: movable portion
101, 201: hydraulic circuit control device
M1: fixed mold
M2: movable mold
W: inner wall surface

The invention claimed is:

1. A hydraulic circuit control device comprising:
a drive motor;
a drive-side cylinder including a drive-side fluid chamber and a drive-side piston that is moved by the drive motor;
a driven-side cylinder including a driven-side fluid chamber, a fluid path that connects the driven-side fluid chamber and the drive-side fluid chamber, and a driven-side piston that is moved by moving the drive-side piston to increase or reduce an amount of a working fluid in the driven-side fluid chamber through the fluid path; and
a fluid path volume adjustment mechanism configured to increase or reduce a volume of the fluid path according to an increase or reduction in a volume of the working fluid, wherein
the fluid path includes a main fluid path portion through which the working fluid flows between the driven-side fluid chamber and the drive-side fluid chamber, and an adjustment fluid path portion connected to the main fluid path portion, and
the fluid path volume adjustment mechanism includes a volume adjustment motor configured to move an inner wall surface of the adjustment fluid path portion, and is configured to move the inner wall surface to increase or reduce a volume of the adjustment fluid path portion.

2. The hydraulic circuit control device according to claim 1, wherein
the fluid path volume adjustment mechanism includes a movement adjustment detection unit configured to detect at least one of positions of the driven-side piston and the drive-side piston and a state of the working fluid in order to adjust a movement amount of the driven-side piston relative to movement of the drive-side piston, and is configured to increase or reduce the volume of the fluid path based on a detection result of the movement adjustment detection unit.

3. The hydraulic circuit control device according to claim 2, wherein
the movement adjustment detection unit includes at least one of a position detection unit configured to detect positions of the drive-side piston and the driven-side piston, a fluid temperature detection unit configured to detect a temperature of the working fluid, and a fluid pressure detection unit configured to detect pressure of the working fluid, and
the fluid path volume adjustment mechanism is configured to increase or reduce the volume of the fluid path based on a detection result of at least one of the position detection unit, the fluid pressure detection unit, and the fluid temperature detection unit.

4. The hydraulic circuit control device according to claim 1, wherein
the fluid path volume adjustment mechanism includes
a volume adjustment piston provided in the fluid path, and
a volume adjustment ball screw mechanism that includes a volume adjustment ball screw to which the volume adjustment piston is attached, and that increases or reduces the volume of the fluid path by moving the volume adjustment piston together with the volume adjustment ball screw.

5. The hydraulic circuit control device according to claim 1, further comprising:
a drive-side ball screw mechanism that includes a drive-side ball screw to which the drive-side piston is attached and that is driven by the drive motor to move the drive-side piston together with the drive-side ball screw; and
a drive-side ball screw cooling path that is provided inside the drive-side ball screw and through which a coolant for cooling the drive-side ball screw flows.

6. The hydraulic circuit control device according to claim 1, wherein the fluid path volume adjustment mechanism is configured to increase or reduce the volume of the fluid path based on at least one of a state index value directly indicating an increase or reduction in the volume of the working fluid and a state index value indirectly indicating the increase or reduction in the volume of the working fluid.

7. A molding machine comprising:

a fixed portion to which a fixed mold is attached;

a movable portion to which a movable mold is attached; and a hydraulic circuit control device provided in the movable portion and configured to move the movable portion relative to the fixed portion, wherein the hydraulic circuit control device includes a drive motor, a drive-side cylinder including a drive-side fluid chamber and a drive-side piston that is moved by the drive motor, a driven-side cylinder including a driven-side fluid chamber, a fluid path that connects the driven-side fluid chamber and the drive-side fluid chamber, and a driven-side piston that is moved by moving the drive-side piston to increase or reduce an amount of a working fluid in the driven-side fluid chamber through the fluid path, and a fluid path volume adjustment mechanism configured to increase or reduce a volume of the fluid path according to an increase or reduction in a volume of the working fluid, wherein the fluid path includes a main fluid path portion through which the working fluid flows between the driven-side fluid chamber and the drive-side fluid chamber, and an adjustment fluid path portion connected to the main fluid path portion, and the fluid path volume adjustment mechanism includes a volume adjustment motor configured to move an inner wall surface of the adjustment fluid path portion, and is configured to move the inner wall surface to increase or reduce a volume of the adjustment fluid path portion.

*    *    *    *    *